May 4, 1954 R. HERCKELBOUT 2,677,177
CUTTING PLIERS
Filed Feb. 1, 1949
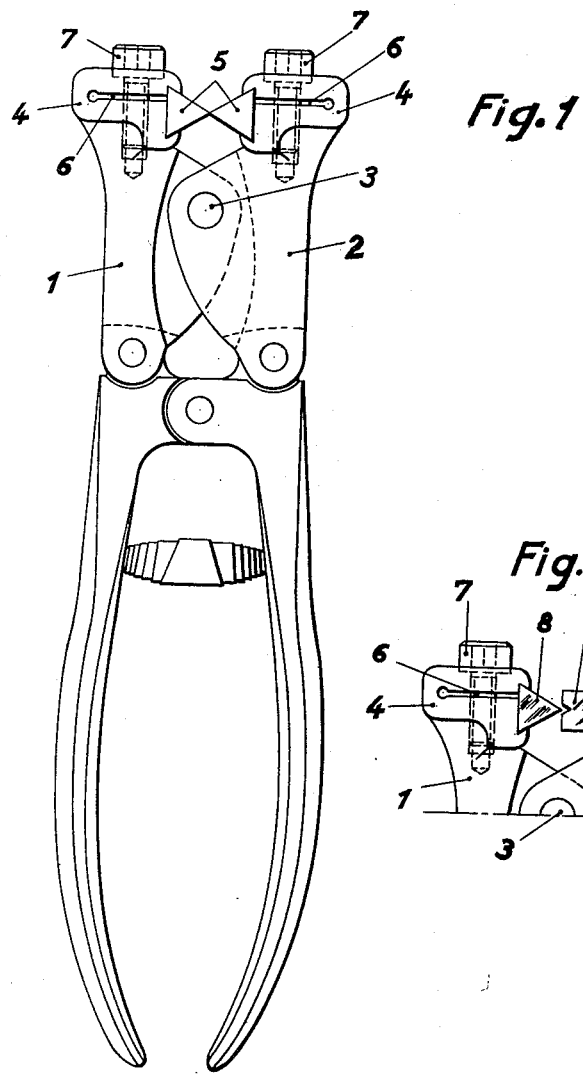
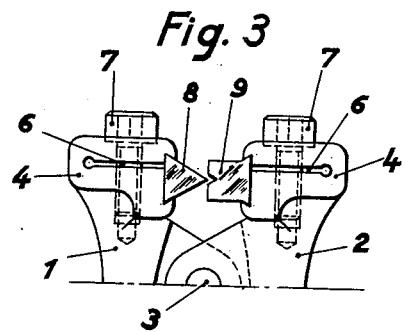
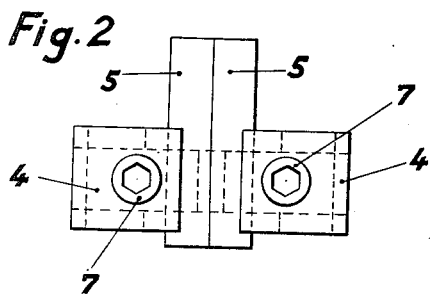

Patented May 4, 1954

UNITED STATES PATENT OFFICE 2,677,177

CUTTING PLIERS

Raoul Herckelbout, Montreuil, France

Application February 1, 1949, Serial No. 73,960

Claims priority, application France February 18, 1948

1 Claim. (Cl. 30—191)

There are at present several models of cutting pliers with detachable grips.

The serious drawback of such pliers consists in that the grips are assembled overhung at the ends of the arms of the pliers and that, owing to this, the fixing-screws of said grips cannot resist pull and shearing stresses which they have to undergo.

The present invention relates to a cutting pliers whose detachable grips do not have the drawback of being fixed overhanging.

Furthermore the grips take such a shape that they each present three cutting edges permitting to triple their length of service.

These grips take the shape of a prism of equilateral triangular section. They are imbedded in the extensible jaws in the form of a dovetail provided at the ends of the arms of the pliers.

These grips, tightened sideways, are applied against the bottom of the jaws and are integral with them without any overhang.

The cutting effort takes place in the median plane of the bearing face of the grips, and owing to this fact, they can support very great strains or stresses.

Lastly this triangular section again offers the advantage of being able to give to the grips a greater length than required.

When the three edges of an end are worn or broken, it only needs removing the grips, to grind or section the worn parts and reassemble the grips in their jaws.

Owing to this possibility, the duration of a cutting pliers made according to the invention is even doubled and in definition these pliers, before the grips are changed, has six times more wear than a cutting pliers with fixed grips.

If the cutting grips are substituted for special male or female grips, the pliers will be transformed into a bending tool.

The invention will be understood by referring to the description about to follow and to the accompanying drawing by way of example, but is not limited, in which:

Fig. 1 shows in elevation, a pliers whose detachable grips are laid down according to the invention;

Fig. 2 is a top view thereof;

Fig. 3 is a part elevational view of a pliers laid down according to the invention, but furnished with special grips transforming it into a bending tool.

In referring to the drawing which represents a hinged pliers, or knuckle-joint, furnished with detachable grips, the objects of the invention, the expanding lever handles 1 and 2 hinged together in 3 will be seen.

These levers each have at their free end, a jaw 4.

These jaws 4 admit the grips 5.

These grips are prismatic and their section is an equilateral triangle.

Owing to this, the housing of the jaws admitting said grips is a dovetail at 60°.

Each jaw is made resilient by a slot or sawcut 6 perpendicular at the bottom of its housing, and a screw 7 ensures an efficient fixing of the grip.

It will be understood that each grip may be fixed in its jaw in three positions so that its three edges may be used successively.

A pliers laid down according to the invention whether hinged or knuckled-jointed may easily be transformed into a tool for bending wires or iron plates.

For this purpose, the cutting grips 5 must be substituted for special grips 8 and 9 respectively, male or female.

Having thus described my invention, what I claim is:

Cutting pliers comprising, in combination, a pair of arms each of which has an end portion formed with a dovetail slot and the dovetail slot in one end portion confronting the dovetail slot in the other end portion; a pair of cutting elements removably located in said slots, respectively, said cutting elements each having three cutting edges and the cross section of an equilateral triangle and said cutting elements respectively having one side portion and two cutting edges respectively located in said dovetail slots while the third edges of the cutting elements are capable of performing the cutting operation in cooperation with each other so that when the said third edge of each cutting element becomes dull the cutting elements may be removed from the slot and relocated therein with a fresh cutting edge located outside of the slot; and means for clamping said cutting elements in said slots.

References Cited in the file of this patent

UNITED STATES PATENTS

| Number | Name | Date |
|---|---|---|
| 710,182 | Carolus | Sept. 30, 1902 |
| 844,134 | Jenkins | Feb. 12, 1907 |
| 1,216,527 | Weloon | Feb. 20, 1917 |
| 1,415,379 | Martin | May 9, 1922 |
| 1,496,984 | Felsch | June 10, 1924 |
| 1,501,162 | Cumfer | July 15, 1924 |
| 1,619,084 | Miller | Mar. 1, 1927 |
| 1,793,590 | Davis | Feb. 24, 1931 |
| 1,818,397 | Hurst | Aug. 11, 1931 |
| 2,477,727 | Engberg | Aug. 2, 1949 |

FOREIGN PATENTS

| Number | Country | Date |
|---|---|---|
| 44,706 | Switzerland | May 5, 1909 |
| 74,971 | Switzerland | May 16, 1917 |
| 712,630 | France | July 29, 1931 |
| 774,948 | France | Oct. 1, 1934 |